US012738238B2

(12) United States Patent
Park et al.

(10) Patent No.: US 12,738,238 B2
(45) Date of Patent: Sep. 15, 2026

(54) DATA DRIVER AND DISPLAY DEVICE COMPRISING SAME

(71) Applicant: LG Display Co., Ltd., Seoul (KR)

(72) Inventors: Yongjin Park, Paju-si (KR); Zonggun Oh, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/984,390

(22) Filed: Dec. 17, 2024

(65) Prior Publication Data

US 2025/0273172 A1 Aug. 28, 2025

(30) Foreign Application Priority Data

Feb. 26, 2024 (KR) ........................ 10-2024-0027086

(51) Int. Cl.
*G09G 3/3275* (2016.01)
*G09G 3/20* (2006.01)

(52) U.S. Cl.
CPC ......... *G09G 3/3275* (2013.01); *G09G 3/2007* (2013.01); *G09G 2310/027* (2013.01); *G09G 2310/0291* (2013.01); *G09G 2310/0297* (2013.01); *G09G 2310/08* (2013.01); *G09G 2330/021* (2013.01)

(58) Field of Classification Search
CPC ............... G09G 3/3275; G09G 3/2007; G09G 2310/027; G09G 2310/0291; G09G 2310/0297; G09G 2310/08; G09G 2330/021
See application file for complete search history.

(56) References Cited

U.S. PATENT DOCUMENTS

| | | | | |
|---|---|---|---|---|
| 7,224,303 B2 * | 5/2007 | Kwon | G09G 3/3241 | 341/145 |
| 7,570,242 B2 * | 8/2009 | Kwon | G09G 3/3233 | 345/98 |
| 8,817,010 B2 * | 8/2014 | Park | G09G 3/3688 | 345/212 |
| 9,424,779 B2 * | 8/2016 | Lee | G09G 3/3291 | |
| 9,842,561 B2 * | 12/2017 | Lee | G09G 3/3688 | |
| 10,147,381 B2 * | 12/2018 | Lee | G09G 3/3688 | |
| 10,204,547 B2 * | 2/2019 | Park | G09G 3/3688 | |
| 10,535,301 B2 * | 1/2020 | Chae | G09G 3/3233 | |
| 10,991,290 B1 * | 4/2021 | Yang | G09G 3/20 | |

(Continued)

FOREIGN PATENT DOCUMENTS

| | | |
|---|---|---|
| KR | 10-2017-0031323 A | 3/2017 |
| KR | 10-2023-0004149 A | 1/2023 |

*Primary Examiner* — Michael J Jansen, II
(74) *Attorney, Agent, or Firm* — Birch, Stewart, Kolasch & Birch, LLP

(57) ABSTRACT

Discussed is a display device including a display panel having a plurality of sub-pixels, a data driver configured to convert image data input from the outside and provide data voltages to the plurality of sub-pixels through a plurality of data lines, and a multiplexer connected between the data driver and the plurality of data lines. The multiplexer includes a plurality of switching elements controlled by a plurality of mux control signals. The data driver includes a plurality of output buffers configured to amplify and output the data voltage based on a bias current, and controls the bias current supplied to each of the output buffers based on a grayscale difference value of the image data provided to the plurality of sub-pixels.

16 Claims, 11 Drawing Sheets

(56) References Cited

U.S. PATENT DOCUMENTS

| | | | | |
|---|---|---|---|---|
| 11,170,730 | B2 * | 11/2021 | Kim | G09G 3/2096 |
| 11,355,053 | B2 * | 6/2022 | Kim | G09G 3/20 |
| 11,410,594 | B1 * | 8/2022 | Chen | G09G 3/2007 |
| 12,008,961 | B2 * | 6/2024 | Hwang | G09G 3/3291 |
| 2006/0077077 | A1 * | 4/2006 | Kwon | G09G 3/325 341/50 |
| 2006/0077137 | A1 * | 4/2006 | Kwon | G09G 3/3283 345/76 |
| 2006/0077139 | A1 * | 4/2006 | Kwon | G09G 3/3283 345/76 |
| 2011/0298781 | A1 * | 12/2011 | Park | G09G 3/3688 345/212 |
| 2012/0038614 | A1 * | 2/2012 | Mizumaki | G09G 3/3614 345/211 |
| 2014/0098083 | A1 * | 4/2014 | Lee | G09G 3/3291 345/82 |
| 2016/0093270 | A1 * | 3/2016 | Lee | G09G 3/3688 345/82 |
| 2016/0155374 | A1 * | 6/2016 | Lee | G09G 3/3696 345/212 |
| 2016/0372028 | A1 * | 12/2016 | Park | G09G 3/2096 |
| 2017/0301306 | A1 * | 10/2017 | Zheng | G09G 3/3648 |
| 2018/0158408 | A1 * | 6/2018 | Chae | G09G 3/3233 |
| 2020/0035188 | A1 * | 1/2020 | Kim | G09G 3/2096 |
| 2020/0152115 | A1 * | 5/2020 | Tu | G09G 3/20 |
| 2020/0335027 | A1 * | 10/2020 | Kim | G09G 3/20 |
| 2024/0021155 | A1 * | 1/2024 | Hwang | G09G 3/3233 |

* cited by examiner

DATA DRIVER AND DISPLAY DEVICE COMPRISING SAME

CROSS-REFERENCE TO RELATED APPLICATION

The present application claims priority to Korean Patent Application No. 10-2024-0027086, filed in the Republic of Korea on Feb. 26, 2024, the entire contents of which is hereby expressly incorporated by reference into the present application.

BACKGROUND

Field

The present disclosure relates to a data driver and a display device including the same, with reduced power consumption.

Discussion of the Related Art

With the development of the information society, various types of display devices are being developed. Various display devices, such as a liquid crystal display (LCD) device, a plasma display panel (PDP) display device, and an organic light emitting diode (OLED) display device, are being used.

Among them, the OLED display device displays images using an OLED. The OLED (hereinafter also referred to as a light emitting element) is a self-emitting element and does not require a separate light source, thereby reducing the thickness and weight of the display device. In addition, the OLED display device shows high-quality characteristics such as low consumed power, high luminance, and a high response time.

The display device can consume much power since it is continuously turned on while information is provided to the user. Therefore, research and development is continuously being conducted to reduce the consumed power of the display device.

SUMMARY OF THE DISCLOSURE

Embodiments of the present disclosure are directed to providing a data driver connecting two or more sub-pixels having the same color to one output buffer through a multiplexer, and a display device including the same.

The embodiments of the present disclosure are also directed to providing a data driver for variably controlling consumed power according to a change in grayscale between data voltages output from outer buffers in the data driver, and a display device including the same.

A display device according to one embodiment of the present disclosure can include a display panel having a plurality of sub-pixels, a data driver configured to convert image data input from an outside and provide data voltages to the plurality of sub-pixels through a plurality of data lines, and a multiplexer connected between the data driver and the plurality of data lines and including a plurality of switching elements controlled by a plurality of mux control signals.

According to an aspect of the present disclosure, the data driver can include a plurality of output buffers configured to amplify and output the data voltage based on the bias current, and control a bias current supplied to each of the output buffers based on a grayscale difference value of the image data provided to the plurality of sub-pixels.

According to an aspect of the present disclosure, the data driver can further include a register unit configured to generate a sampling signal using a data driving control signal applied from the outside, a latch unit configured to sequentially latch the image data and sequentially output the image data in response to the sampling signal, a digital-to-analog converter configured to convert the image data output from the latch unit into gamma compensation voltages and generate the data voltages, a calculation unit configured to determine the grayscale difference value of the image data sequentially output from the latch unit, and a power control circuit configured to generate the bias current having the magnitude corresponding to the grayscale difference value and apply the bias current to the plurality of output buffers.

According to an aspect of the present disclosure, the power control circuit can decrease the magnitude of the bias current when the grayscale difference value is small and increase the magnitude of the bias current when the grayscale difference value is large.

According to an aspect of the present disclosure, the consumed power can be changed in proportion to the magnitude of the bias current.

According to an aspect of the present disclosure, the calculation unit can determine the grayscale difference value of the image data sequentially output with respect to each of the output buffers, and the power control circuit can independently adjust the magnitude of the bias current for each of the output buffers in response to the grayscale difference value.

According to an aspect of the present disclosure, the calculation unit can compare the grayscale difference values with respect to the plurality of output buffers configured to output the data voltages to the sub-pixels having the same color, and the power control circuit can adjust the magnitude of the bias current for the plurality of output buffers according to a result of comparison.

According to an aspect of the present disclosure, the calculation unit can determine a maximum value or mean value of the grayscale difference values with respect to the plurality of output buffers configured to output the data voltages to the sub-pixels having the same color, and the power control circuit can adjust the magnitude of the bias current for the plurality of output buffers configured to output the data voltage to the sub-pixels having the same color in response to the maximum value or mean value of the grayscale difference values.

According to an aspect of the present disclosure, one output buffer can be connected to a plurality of sub-pixels having the same color through the plurality of switching elements of the multiplexer.

According to an aspect of the present disclosure, one switching element can be connected between the one output buffer and one sub-pixel.

According to an aspect of the present disclosure, the plurality of switching elements connected to the one output buffer can be controlled by mux control signals having different turn-on periods.

According to an aspect of the present disclosure, when one mux control signal is turned on, the data voltage can be output to sub-pixels having different colors constituting one unit pixel from the plurality of output buffers.

A display device according to one embodiment of the present disclosure can include a display panel having a plurality of sub-pixels, a data driver configured to convert image data input from the outside and provide data voltages to the plurality of sub-pixels through a plurality of data lines, and a multiplexer connected between the data driver and the plurality of data lines and composed of a plurality of switching elements controlled by a plurality of mux control signals.

According to an aspect of the present disclosure, one output buffer can be connected to a plurality of sub-pixels having the same color through the plurality of switching elements of the multiplexer.

According to an aspect of the present disclosure, one switching element can be connected between the one output buffer and one sub-pixel.

According to an aspect of the present disclosure, the plurality of switching elements connected to the one output buffer can be controlled by mux control signals having different turn-on periods.

According to an aspect of the present disclosure, when one mux control signal is turned on, the data voltage can be output to sub-pixels having different colors constituting one unit pixel from the plurality of output buffers.

According to an aspect of the present disclosure, the data driver can have consumed power changed based on the grayscale difference value of the image data provided to the plurality of sub-pixels.

According to an aspect of the present disclosure, the data driver can include a register unit configured to generate a sampling signal using a data driving control signal applied from the outside, a latch unit configured to sequentially latch the image data and sequentially output the image data in response to the sampling signal, a digital-to-analog converter configured to convert the image data output from the latch unit into gamma compensation voltages and generate the data voltages, a plurality of output buffers configured to amplify and output the data voltage based on a bias current, a calculation unit configured to determine the grayscale difference value of the image data sequentially output from the latch unit, and a power control circuit configured to generate the bias current having the magnitude corresponding to the grayscale difference value and apply the bias current to the plurality of output buffers.

According to an aspect of the present disclosure, the power control circuit can decrease the magnitude of the bias current when the grayscale difference value is small and increase the magnitude of the bias current when the grayscale difference value is large.

According to an aspect of the present disclosure, the calculation unit can determine the grayscale difference value of the image data sequentially output with respect to each of the output buffers, and the power control circuit can independently adjust the magnitude of the bias current for each of the output buffers in response to the grayscale difference value.

According to an aspect of the present disclosure, the calculation unit can determine a maximum value or mean value of the grayscale difference values with respect to the plurality of output buffers configured to output the data voltages to the sub-pixels having the same color, and the power control circuit can adjust the magnitude of the bias current for the plurality of output buffers configured to output the data voltage to the sub-pixels having the same color in response to the maximum value or mean value of the grayscale difference values.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
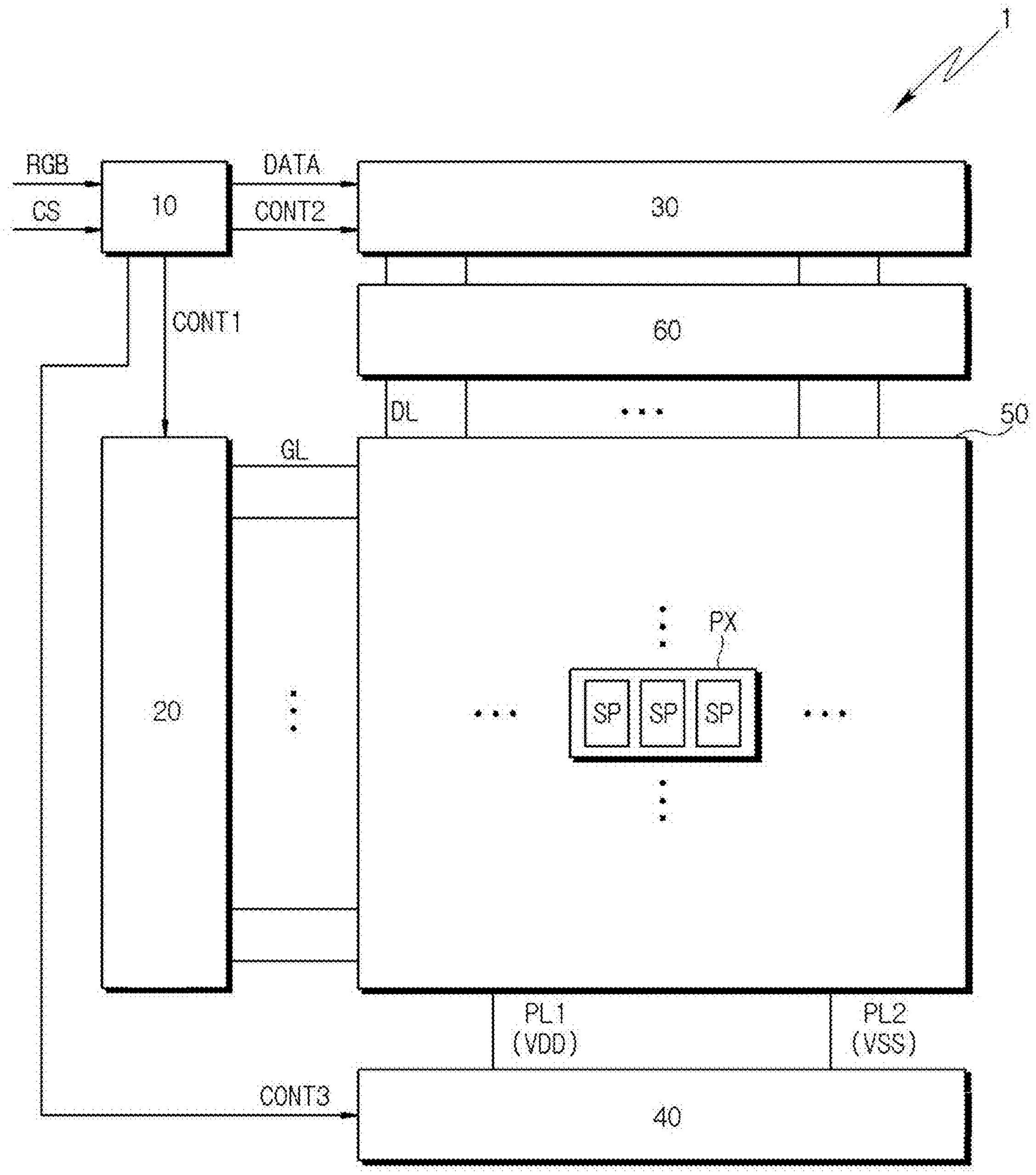
FIG. 1 is a block diagram showing a configuration of a display device according to one embodiment of the present disclosure.

Detailed matters of embodiments of the present disclosure are included in a detailed description and accompanying drawings.

Advantages and features of the present disclosure and methods for achieving them will become clear with reference to embodiments of the present disclosure described below in detail in conjunction with the accompanying drawings. However, the present disclosure is not limited to the embodiments of the present disclosure disclosed below, but can be implemented in any of various different forms, and in the following description, when a certain part is connected to another part, it includes not only a case where the certain part is directly connected to another part, but also a case where the certain part is electrically connected to another part with other elements interposed therebetween. In addition, in the drawings, parts unrelated to the present disclosure are omitted to clarify the description of the present disclosure, and similar parts are denoted by the same reference numerals throughout the disclosure.

Further, features of various embodiments of the present disclosure can be partially or entirely coupled to or combined with each other and can be operated, linked, or driven together in various ways. Embodiments of the present disclosure can be carried out independently from each other, or can be carried out together in co-dependent or related relationship. Also all components of each display device according to all embodiments of the present disclosure are operatively coupled and configured.

FIG. 1 is a block diagram showing a configuration of a display device according to one embodiment of the present disclosure.

Referring to FIG. 1, a display device 1 includes a timing controller 10, a gate driver 20, a data driver 30, a power supply unit 40, and a display panel 50.

The timing controller 10 can receive an image signal RGB and a control signal CS from the outside. The image signals RGB can include a plurality of grayscale data. The control signal CS can include, for example, a horizontal synchronization signal, a vertical synchronization signal, and a main clock signal.

The timing controller 10 can process the image signal RGB and the control signal CS according to operating conditions of the display panel 50 to generate and output image data DATA, a gate driving control signal CONT1, a data driving control signal CONT2, and a power supply control signal CONT3. The data driving control signal CONT2 can include, for example, a source output enable SOE signal, a power control signal, etc.

The gate driver 20 can be connected to unit pixels PX of the display panel 50 through a plurality of gate lines GL. The gate driver 20 can generate gate signals based on a gate driving control signal CONT1 output from the timing controller 10. The gate driver 20 can provide the generated gate signals to the unit pixels PX through the plurality of gate lines GL.

The data driver 30 can be connected to the unit pixels PX of the display panel 50 through a plurality of data lines DL. The data driver 30 can generate data voltages based on the image data DATA and a data drive control signal CONT2 output from the timing controller 10. The data driver 30 can provide the generated data voltages to the unit pixels PX through the plurality of data lines DL. Data voltages can be applied to the unit pixels PX of a pixel column selected by the gate signal. To this end, the data driver 30 can supply the data voltages to the plurality of data lines DL in synchronization with the gate signals.

The data driver 30 can be a data driving integrated circuit (IC). Alternatively, the data driver 30 can be referred to as a set of one or more data driving ICs. In the following embodiments, no special distinction is made between the data driver 30 and the data driving IC. In other words, in the following embodiments, the data driver 30 can be referred to as one data driving IC or can be referred to as one driver composed of the plurality of data driving ICs. The data driver 30 can include a register unit, a latch unit, a digital-to-analog converter, and one or more output buffers, and can generate the data voltage and output the generated data voltage to the data line DL connected to the output buffer.

The power supply unit 40 can be connected to the unit pixels PX of the display panel 50 through a plurality of power lines PL1 and PL2. The power supply unit 40 can generate a driving voltage to be provided to the display panel 50 based on the power supply control signal CONT3. The driving voltage can include, for example, a high potential driving voltage VDD and a low potential driving voltage VSS. The power supply unit 40 can provide the generated driving voltages VDD and VSS to the unit pixels PX through the corresponding power lines PL1 and PL2.

The unit pixels PX are disposed on the display panel 50. Each unit pixel PX can include one or more sub-pixels SP. For example, as shown, the unit pixel PX can include the plurality of sub-pixels SP. The sub-pixels SP can be arranged on the display panel 50 in a matrix form.

Each sub-pixel SP can be electrically connected to the corresponding gate line and data line. The sub-pixels SP can emit light with luminance corresponding to the gate signal and data voltage supplied through the gate lines and the data lines DL.

Each sub-pixel SP can display one of first to third colors. In one embodiment, each sub-pixel SP can display any one of red, green, and blue. In another embodiment, each sub-pixel SP can display any one of cyan, magenta, and yellow. In various embodiments of the present disclosure, the sub-pixels SP can be configured to display any one of three or four or more colors. For example, each sub-pixel SP can display any one of red, green, blue, and white.

In one embodiment, the display device 1 can include a multiplexer 60 connected between the data driver 30 and the sub-pixels to drive the data lines DL in a time-division manner. The multiplexer 60 connects the output buffer in the data driver 30 to two or more data lines DL. In addition, the multiplexer 60 can reduce the number of data driving ICs and output buffers provided in the data driver 30 by dividing the data voltage output from the output buffers in the data driver 30 to the data lines DL in a time-division manner.

In one embodiment, the multiplexer 60 can include a plurality of switching elements connected between the data driver 30 and the data line DL. For example, the multiplexer 60 can be configured to connect one output buffer to one or more data lines DL through the switching elements.

In FIG. 1, the gate driver 20, the data driver 30, and the multiplexer 60 are shown as components separate from the display panel 50, but at least one of the gate driver 20, the data driver 30, and the multiplexer 60 can be configured in an in-panel type that is formed integrally with the display panel 50. For example, the gate driver 20 can be formed integrally with the display panel 50 according to a gate in panel (GIP) type.

The timing controller 10, the gate driver 20, the data driver 30, and the power supply unit 40 can each be configured as a separate IC or at least a partially integrated IC. For example, the timing controller 10, the data driver 30, and the power supply unit 40 can be configured as a driving chip in the form of an integrated IC. For example, such a driving chip can be implemented in the form of a flexible printed circuit board (FPCB).

Figure 2:
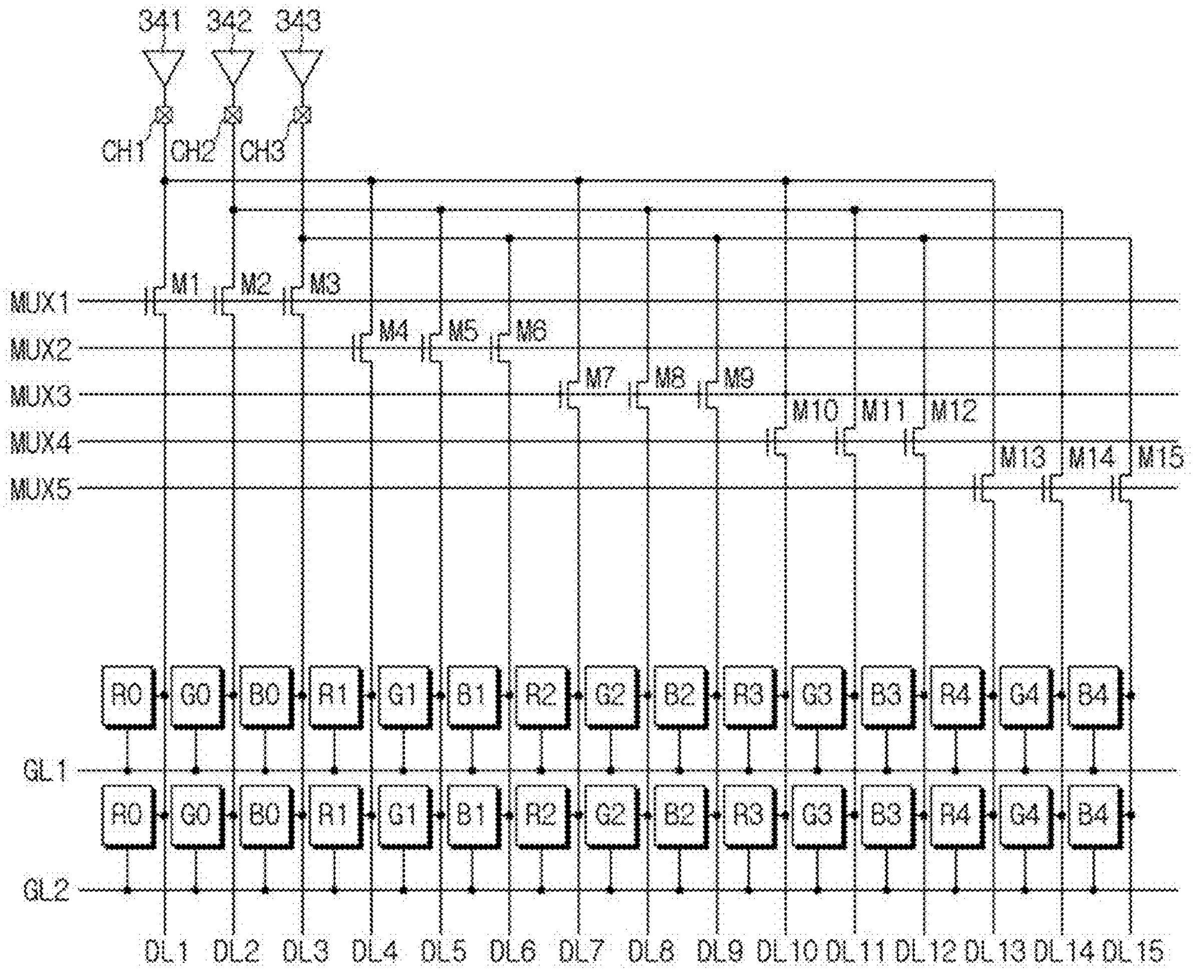
FIG. 2 is a block diagram showing a connection relationship between an output buffer, a multiplexer, and a display panel according to one embodiment of the present disclosure.

FIG. 2 is a block diagram showing the connection relationship between an output buffer, a multiplexer, and a display panel according to one embodiment of the present disclosure.

Referring to FIG. 2, the data driver 30 (see FIG. 1) includes a plurality of output buffers 341, 342, and 343. The output buffers 341, 342, and 343 can output the data voltages through the corresponding channels CH1, CH2, and CH3, respectively. In FIG. 2, the three output buffers 341, 342, and 343 are shown as an example, but more output buffers can be disposed, e.g., at the right side.

The multiplexer 60 (see FIG. 1) includes a plurality of switching elements M1 to M15. In FIG. 2, the fifteen switching elements M1 to M15 are shown as an example, but a larger number of switching elements can be disposed at the right side.

Each of the switching elements M1 to M15 can be connected to any one of the output buffers 341, 342, and 343 of the data driver 30. In this case, the two or more of the switching elements M1 to M15 can be connected to one of the output buffers 341, 342, and 343. For example, the first, fourth, seventh, tenth, and thirteenth switching elements M1, M4, M7, M10, and M13 can be connected to the first output buffer 341, the second, fifth, eighth, eleventh, and fourteenth switching elements M2, M5, M8, M11, and M14 can be connected to the second output buffer 342, and the third, sixth, ninth, twelfth, and fifteenth switching elements M3, M6, M9, M12, and M15 can be connected to the third output buffer 343. For example, five of the switching elements M1 to M15 are connected to one of the output buffers 341, 342, and 343, but the present disclosure is not limited thereto.

The turn-on and turn-off of the switching elements M1 to M15 can be controlled through mux control signals MUX1 to MUX5 provided from the timing controller 10 (see FIG. 1), etc. Specifically, the first to third switching elements M1 to M3 can be controlled according to the first mux control signal MUX1, the fourth to sixth switching elements M4 to M6 can be controlled according to the second mux control signal MUX2, and the seventh to ninth switching elements M7 to M9 can be controlled according to the third MUX control signal MUX3. In addition, the tenth to twelfth switching elements M10 to M12 can be controlled according to the fourth mux control signal MUX4, and the thirteenth to fifteenth switching elements M13 to M15 can be controlled according to the fifth mux control signal MUX5. Here, since the switching elements M1 to M15 are controlled by the five mux control signals MUX1 to MUX5, the multiplexer 60 can be referred to as a 5MUX structure.

In the present embodiment, the switching elements M1 to M15 controlled by the mux control signals MUX1 to MUX5 having different turn-on periods are connected to one of the output buffers 341, 342, and 343. In other words, the fifteen switching elements M1 to M15 controlled by the first to fifth mux control signals MUX1 to MUX5, respectively can be connected to each of the output buffers 341, 342, and 343. For example, the switching elements M1 to M3 controlled by the first multiplexer control signal MUX1 may be connected to each of the output buffers 341, 342, and 343, respectively.

The display panel 50 (see FIG. 1) includes the plurality of unit pixels PX disposed in a matrix form. FIG. 2 shows an example in which one unit pixel PX is composed of three sub-pixels R, G and B, where FIG. 2 shows that the multiple unit pixels includes sub-pixels (R0, G0, B0), (R1, G1, B1), (R2, G2, B2), (R3, G3, B3) and (R4, G4, B4) respectively. For example, the sub-pixels R0 to R4, G0 to G4, and B0 to B4 can include the red sub-pixel R0 to R4, the green sub-pixel G0 to G4, and the blue sub-pixel B0 to B4.

Each of the sub-pixels R0 to R4, G0 to G4, and B0 to B4 is connected to the corresponding data lines DL1 to DL15 and gate lines GL1 and GL2. FIG. 2 shows fifteen data lines DL1 to DL15 as an example, but more data lines can be disposed at the right side. In addition, FIG. 2 shows two gate lines GL1 and GL2 as an example, but a larger number of gate lines can be disposed downward.

The red sub-pixels R0 to R4, the green sub-pixels G0 to G4, and the blue sub-pixels B0 to B4 can be disposed sequentially and repeatedly in one sub-pixel row. One of the red sub-pixels R0 to R4, one of the green sub-pixels G0 to G4, and one of the blue sub-pixels B0 to B4 disposed adjacent to each other can form one unit pixel PX (see FIG. 1).

In one embodiment, the sub-pixels R0 to R4, G0 to G4, and B0 to B4 having the same color can be disposed in the same sub-pixel column. For example, a plurality of the red sub-pixels R0 can be disposed in first-pixel column, a plurality of the red sub-pixels R1 may be disposed in fourth sub-pixel column, a plurality of the green sub-pixels G0 can be disposed in second sub-pixel columns, a plurality of the green sub-pixels G1 may be disposed in fifth sub-pixel columns, a plurality of the blue sub-pixels B0 can be disposed in third sub-pixel column, and a plurality of the blue sub-pixels B1 may be disposed in sixth sub-pixel column. However, the present embodiment is not limited thereto. In other words, in various other embodiments of the present disclosure, the sub-pixels R0 to R4, G0 to G4, and B0 to B4 having different colors can be disposed in one sub-pixel row according to a predetermined pattern.

The switching elements M1 to M15 of the multiplexer 60 are connected to input terminals of the data lines DL1 to DL15, respectively. In one embodiment, the sub-pixels R0 to R4, G0 to G4, and B0 to B4 having the same color can be connected to one of the output buffers 341, 342, and 343 through the switching elements M1 to M15. For example, the red sub-pixels R0 to R4 can be connected to the first output buffer 341 through the first, fourth, seventh, tenth, and thirteenth switching elements M1, M4, M7, M10, and M13, the green sub-pixels G0 to G4 can be connected to the second output buffer 342 through the second, fifth, eighth, eleventh, and fourteenth switching elements M2, M5, M8, M11, and M14, and the blue sub-pixels B0 to B4 can be connected to the third output buffer 343 through the third, sixth, ninth, twelfth, and fifteenth switching elements M3, M6, M9, M12, and M15. However, the present embodiment is not limited thereto.

When the switching elements M1 to M15 are turned on according to the mux control signals MUX1 to MUX5, the data voltage can be applied to the data lines DL1 to DL15 connected to the corresponding switching elements M1 to M15. In one embodiment, when one of the mux control signals MUX1 to MUX5 is turned on, the data voltage can be applied to one of the sub-pixels R0 to R4, one of G0 to G4, and one of B0 to B4 constituting one unit pixel PX. In other words, the sub-pixels R0 to R4, G0 to G4, and B0 to B4 constituting one unit pixel PX can be respectively connected to three of the switching elements M1 to M15 controlled through one mux control signal MUX, where MUX can be one of the mux control signals MUX1 to MUX5.

Therefore, when the first to third switching elements M1 to M3 are turned on according to the first mux control signal MUX1, the data voltage can be applied to the sub-pixels R0, G0, and B0 connected one-to-one to the first to third data lines DL1 to DL3. In addition, when the fourth to sixth switching elements M4 to M6 are turned on according to the second mux control signal MUX2, the data voltage can be applied to the sub-pixels R1, G1, and B1 connected one-to-one to the fourth to sixth data lines DL4 to DL6. In addition, when the seventh to ninth switching elements M7 to M9 are turned on according to the third mux control signal MUX3, the data voltage can be applied to the sub-pixels R2, G2, and B2 connected one-to-one to the seventh to ninth data lines DL7 to DL9. In addition, when the tenth to twelfth switching elements M10 to M12 are turned on according to the fourth mux control signal MUX4, the data voltage can be applied to the sub-pixels R3, G3, and B3 connected one-to-one to the tenth to twelfth data lines DL10 to DL12. In addition, when the thirteenth to fifteenth switching elements M13 to M15 are turned on according to the fifth mux control signal MUX5, the data voltage can be applied to the sub-pixels R4, G4, and B4 connected one-to-one to the thirteenth to fifteenth data lines DL13 to DL15.

In one embodiment, the switching elements M1 to M15 can be formed as transistors. In the shown embodiment, the switching elements M1 to M15 are NMOS transistors. In the present embodiment, the turn-on levels of the mux control signals MUX1 to MUX3 have high levels. However, the present embodiment is not limited thereto. In other words, in another embodiment, the switching elements M1 to M15 can be PMOS transistors. In the present embodiment, the turn-on levels of the mux control signals MUX1 to MUX3 have low levels.

Figure 3:
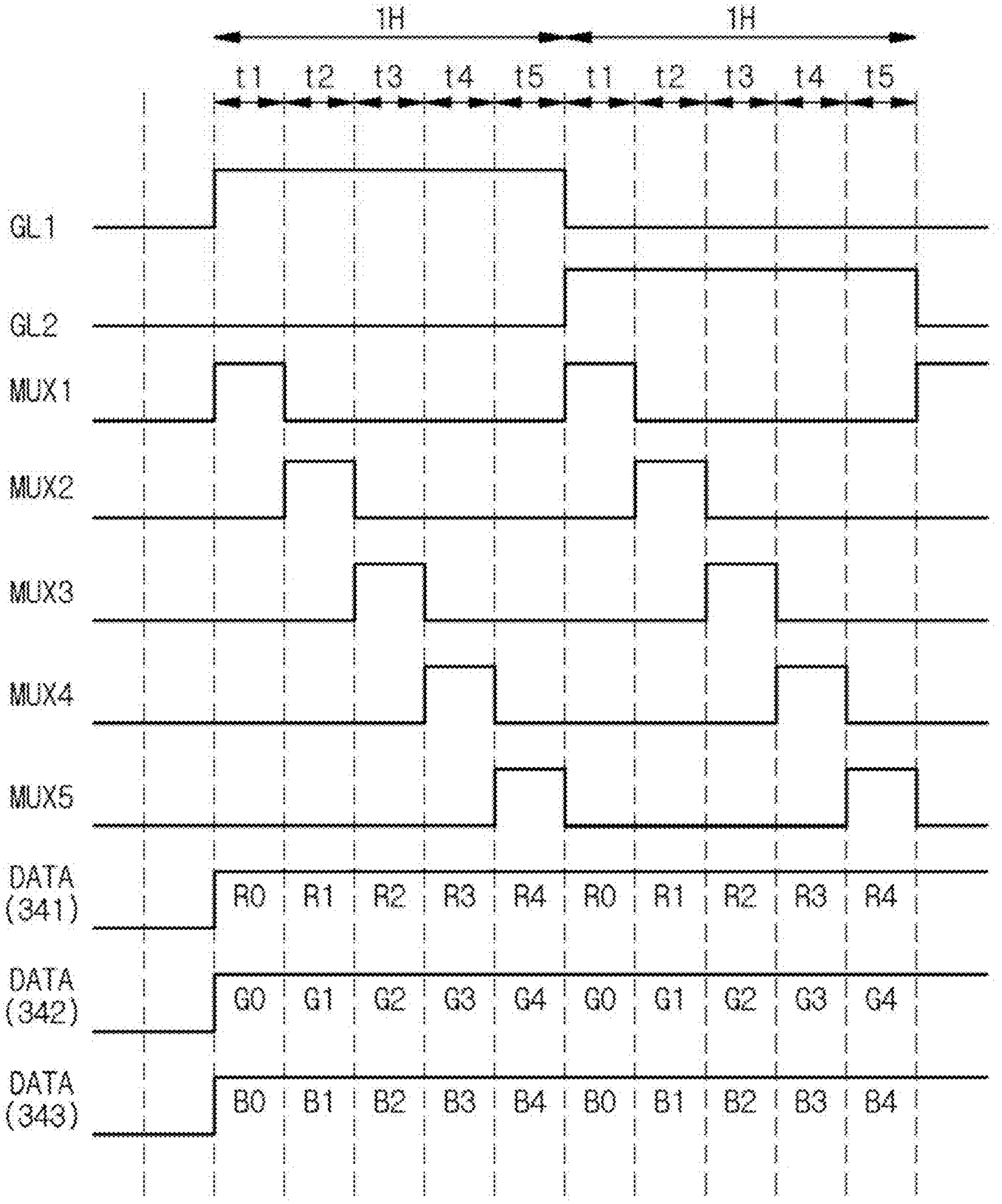
FIG. 3 is a waveform diagram of control and driving signals applied to the display device according to one embodiment of the present disclosure.

FIG. 3 is a waveform diagram of control and driving signals applied to the display device according to one embodiment of the present disclosure.

Referring to FIGS. 2 and 3 together, while the display device 1 (see FIG. 1) is driven, the gate signal at the turn-on level is sequentially applied to the gate lines GL1 and GL2. In this case, each gate signal can be applied at the turn-on level for one horizontal period (1H).

Each of the output buffers 341, 342, and 343 can divide one horizontal period (1H) in a time-division manner and sequentially output the data voltage to the sub-pixels R0 to R4, G0 to G4, and B0 to B4 constituting multiple unit pixels PX (see FIG. 1) For example, each of the output buffers 341, 342, and 343 can output data voltages of the first red sub-pixel R0, the first green sub-pixel G0, and the first blue sub-pixel B0 during a first period t1, output data voltages of the second red sub-pixel R1, the second green sub-pixel G1, and the second blue sub-pixel B1 during a second period t2, and output data voltages of the third red sub-pixel R2, the third green sub-pixel G2, and the third blue sub-pixel B2 during a third period t3 of the one horizontal period (1H). For example, the output buffers 341, 342, and 343 can output data voltages of the fourth red sub-pixel R3, the fourth green sub-pixel G3, and the fourth blue sub-pixel B3, respectively, during a fourth period t4 and output data voltages of the fifth red sub-pixel R4, the fifth green sub-pixel G4, and the fifth blue sub-pixel B4, respectively, during a fifth period t5 of the one horizontal period (1H).

The timing control unit 10 (see FIG. 1) provides the mux control signals MUX1 to MUX5 to allow the switching elements M1 to M15 of the multiplexer 60 to be sequentially turned on during one horizontal period (1H).

The first mux control signal MUX1 at the turn-on level is applied to the multiplexer 60 during the first period t1 of a first one horizontal period. Then, the first to third switching elements M1 to M3 can be turned on to apply the data voltages output from the output buffers 341, 342, and 343 to the first sub-pixels R0, G0, and B0, respectively. The second mux control signal MUX2 at the turn-on level is applied to the multiplexer 60 during the second period t2. Then, the fourth to sixth switching elements M4 to M6 can be turned on to apply the data voltages output from the output buffers 341, 342, and 343 to the second sub-pixels R1, G1, and B1, respectively.

The third mux control signal MUX3 at the turn-on level is applied to the multiplexer 60 during the third period t3. Then, the seventh to ninth switching elements M7 to M9 can be turned on to apply the data voltages output from the output buffers 341, 342, and 343 to the third sub-pixels R2, G2, and B2, respectively. The fourth mux control signal MUX4 at the turn-on level is applied to the multiplexer 60 during the fourth period t4. Then, the tenth to twelfth switching elements M10 to M12 can be turned on to apply the data voltages output from the output buffers 341, 342, and 343 to the fourth sub-pixels R3, G3, and B3, respectively. The fifth mux control signal MUX5 at the turn-on level is applied to the multiplexer 60 during the fifth period t5. Then, the thirteenth to fifteenth switching elements M13 to M15 can be turned on to apply the data voltages output from the output buffers 341, 342, and 343 to the fifth sub-pixels R4, G4, and B4, respectively.

Figure 4:
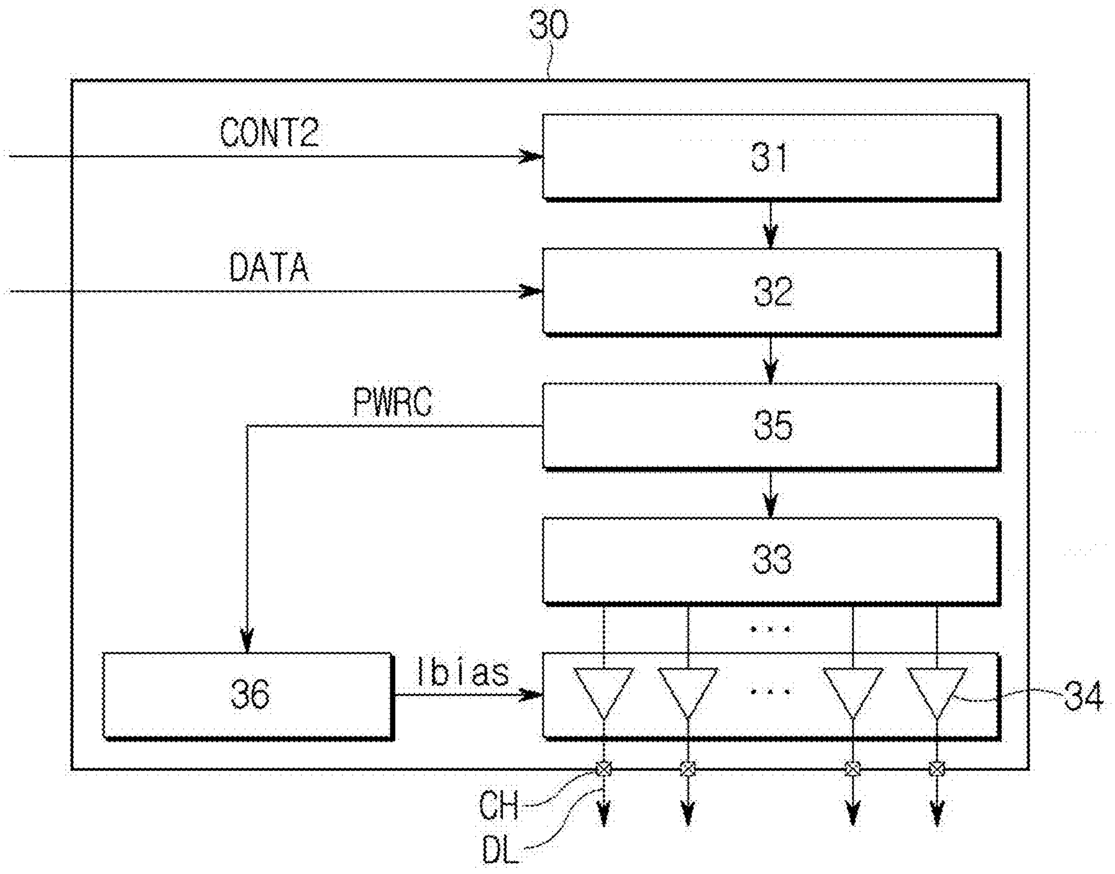
FIG. 4 is a block diagram showing a configuration of a data driver of a display device according to one embodiment of the present disclosure.

FIG. 4 is a block diagram showing a configuration of a data driver according to one embodiment of the present disclosure.

Referring to FIG. 4, the data driver 30 can include a register unit 31, a latch unit 32, a digital-to-analog converter 33, and a plurality of output buffers 34.

The register unit 31 generates a sampling signal using the data driving control signal CONT2 received from the timing controller 10 (see FIG. 1) and provides the generated sampling signal to the latch unit 32.

The latch unit 32 sequentially latches the image data DATA received from the timing controller 10 and then sequentially outputs the image data DATA to the digital-to-analog converter 33 in response to the sampling signal received from the register unit 31.

The digital-to-analog converter 33 converts the image data DATA received from the latch unit 32 into gamma compensation voltages to generate data voltages.

Each of the output buffers 34 outputs the data voltage output from the digital-to-analog converter 33 to the data line DL through the channel CH according to the source output enable SOE signal received from the timing controller 10. The output buffer 34 can amplify the data voltage based on a bias current Ibias and output the amplified data voltage to the data line DL.

The data driver 30 according to one embodiment of the present disclosure can be configured to adjust the consumed power of the data driver 30 and/or the output buffer 34 based on the grayscale of the image data DATA to be output from the output buffer 34. To this end, the data driver 30 can further include a calculation unit 35 and a power control circuit 36.

The calculation unit 35 can compare the image data DATA sequentially received from the latch unit 32 and determine a grayscale difference value of the image data DATA. In other words, the calculation unit 35 can determine the grayscale difference value of the image data DATA to be output next based on the grayscale of the image data DATA to be output first with respect to the image data DATA transmitted from the latch unit 32.

The calculation unit 35 can transmit the determined grayscale difference value to the power control circuit 36. For example, the grayscale difference value can be output in the form of a power control signal PWRC. In one embodiment, the power control signal PWRC can be a logic signal at a predetermined level corresponding to the grayscale difference value. In the present embodiment, the calculation unit 35 can be configured to divide the grayscale difference value into a plurality of threshold ranges and output a logic signal indicating a threshold range that includes the determined grayscale difference value. However, the present embodiment is not limited thereto.

The power control circuit 36 can generate the bias current Ibias based on the power control signal PWRC provided from the calculation unit 35 and apply the generated bias current Ibias to the output buffer 34. The magnitude of the bias current Ibias can be changed depending on the grayscale difference value indicated by the power control signal PWRC, etc. For example, the power control circuit 36 can decrease the magnitude of the bias current Ibias when the grayscale difference value is small and increase the magnitude of the bias current Ibias when the grayscale difference value is large. The magnitude of the bias current Ibias according to the grayscale difference value can be defined as shown in Table 1 below.

TABLE 1

| Grayscale Difference Value | Magnitude of Bias Current |
|---|---|
| 200 grayscale or more | Maximum current (fifth level) |
| 150 grayscale or more to less than 200 grayscale | High current (fourth level) |
| 100 grayscale or more to less than 150 grayscale | Commercial current (third level) |

TABLE 1-continued

| Grayscale Difference Value | Magnitude of Bias Current |
|---|---|
| 50 grayscale or more to less than 100 grayscale | Low current (second level) |
| 50 grayscale or less | Minimum current (first level) |

The output buffer 34 can be configured to amplify the data voltage based on the bias current Ibias and output the amplified data voltage to the data line DL. The bias current Ibias determines a slew rate of the data voltage output from the output buffer 34. As the grayscale difference between the data voltages sequentially output from the output buffer 34 increases, the transition magnitude of the data voltage increases, and the slew rate should be increased to quickly reach the required data voltage. Therefore, the output buffer 34 can increase the slew rate of the output voltage by increasing the magnitude of the bias current Ibias according to the grayscale difference value of the data voltages.

Conversely, when the grayscale difference between the data voltages sequentially output from the output buffer 34 is small, the slew rate can be decreased, and thus the output buffer 34 can decrease the magnitude of the bias current Ibias to reduce consumed power of the output buffer, wherein consumed power of the output buffer 34 is changed in proportion to the magnitude of the bias current Ibias.

As a result, the data driver 30 according to one embodiment of the present disclosure controls the consumed power of the output buffer 34 based on the grayscale difference value of the image data DATA.

Figure 5:
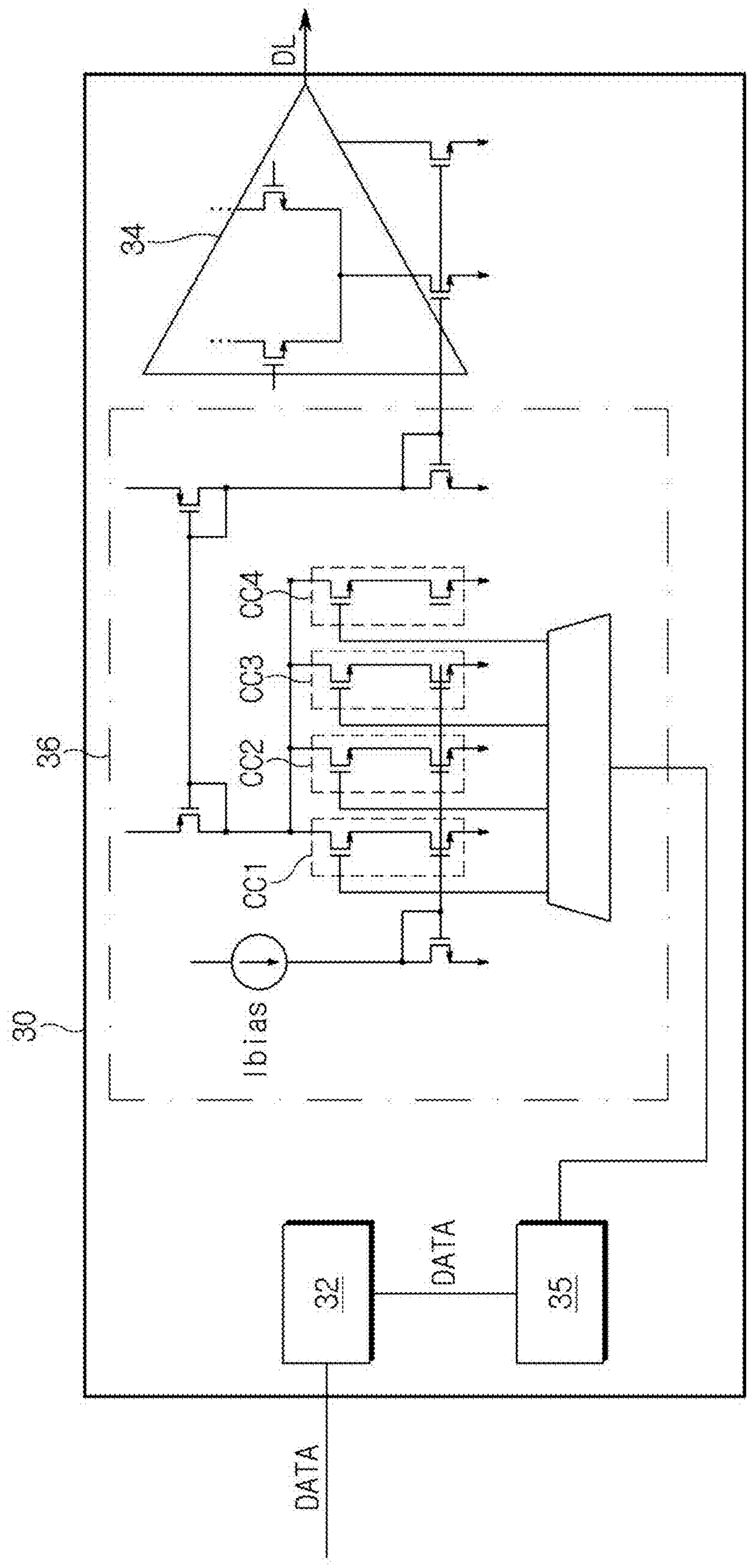
FIG. 5 is a circuit diagram showing a connection relationship between a calculation unit, a power control circuit, and an output buffer according to one embodiment of the present disclosure.

FIG. 5 is a circuit diagram showing the connection relationship between a calculation unit, a power control circuit, and the output buffer according to one embodiment of the present disclosure.

Referring to FIG. 5, the calculation unit 35 can determine the grayscale difference value of the sequentially input image data DATA and output the power control signal PWRC corresponding to the determined grayscale difference value. The output power control signal PWRC can be provided to the power control circuit 36.

The power control circuit 36 receives the bias current Ibias from an external current source, etc. A plurality of current control circuits CC1 to CC4 convert the magnitude of the bias current Ibias in response to the power control signal PWRC. The plurality of current control circuits CC1 to CC4 supply the bias current Ibias whose magnitude has been converted to the output buffer 34. In this case, the bias current Ibias can be output by being amplified as many as the number of current control circuits CC1 to CC4 to be turned on. Although four current control circuits CC1 to CC4 are shown in FIG. 5, the number of current control circuits CC1 to CC4 is not limited thereto, and a fewer or larger number of current control circuits CC1 to CC4 can be used.

The output buffer 34 can output the data voltage based on the bias current Ibias transmitted from the power control circuit 36. In this case, the consumed power of the output buffer 34 and the data driver 30 can be adjusted according to the magnitude of the bias current Ibias changed in the output buffer 34.

Figure 6A:
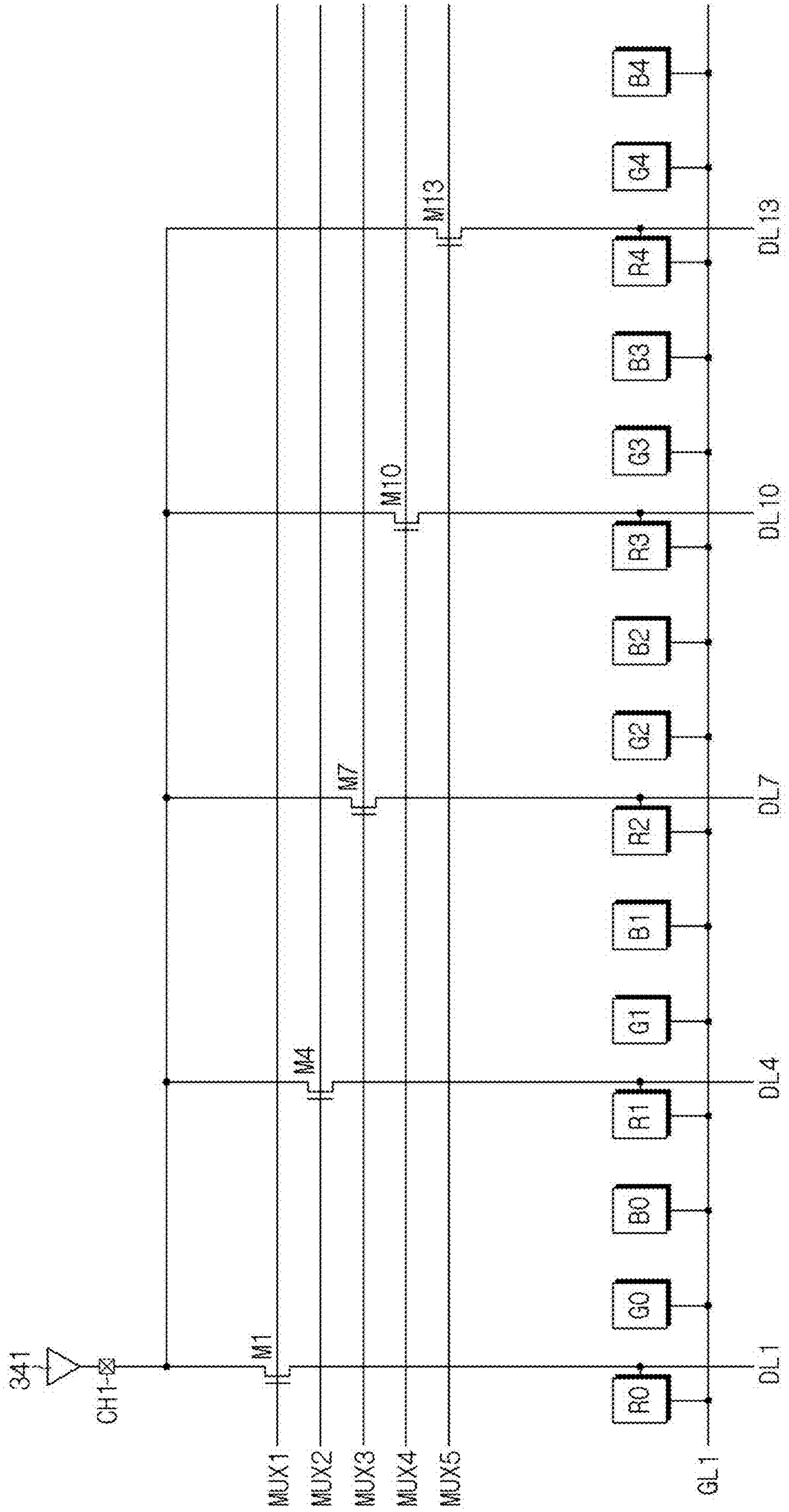
FIGS. 6A to 6C are views for describing a method of controlling consumed power of an output buffer according to one embodiment of the present disclosure.
Figure 6B:
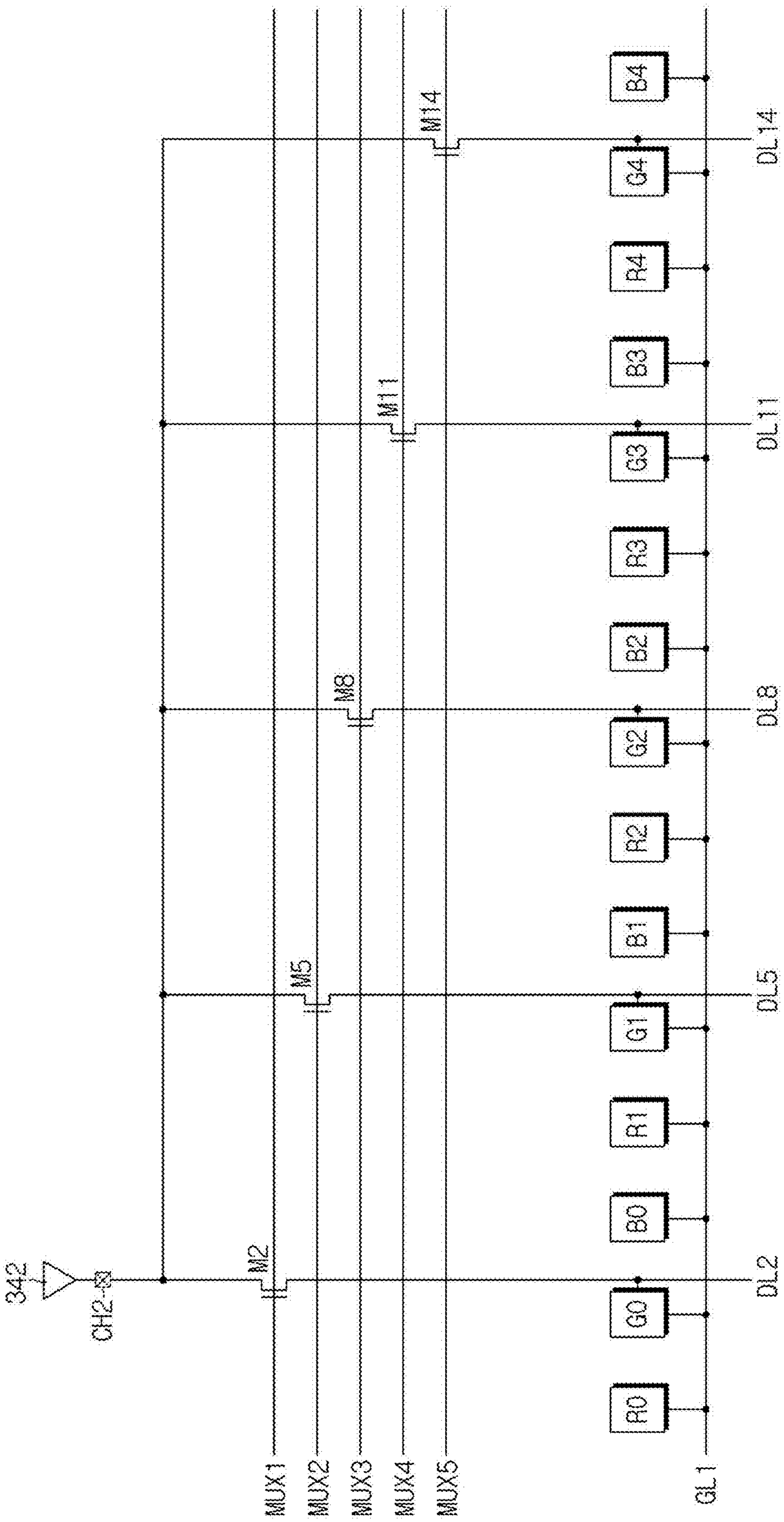
Figure 6C:
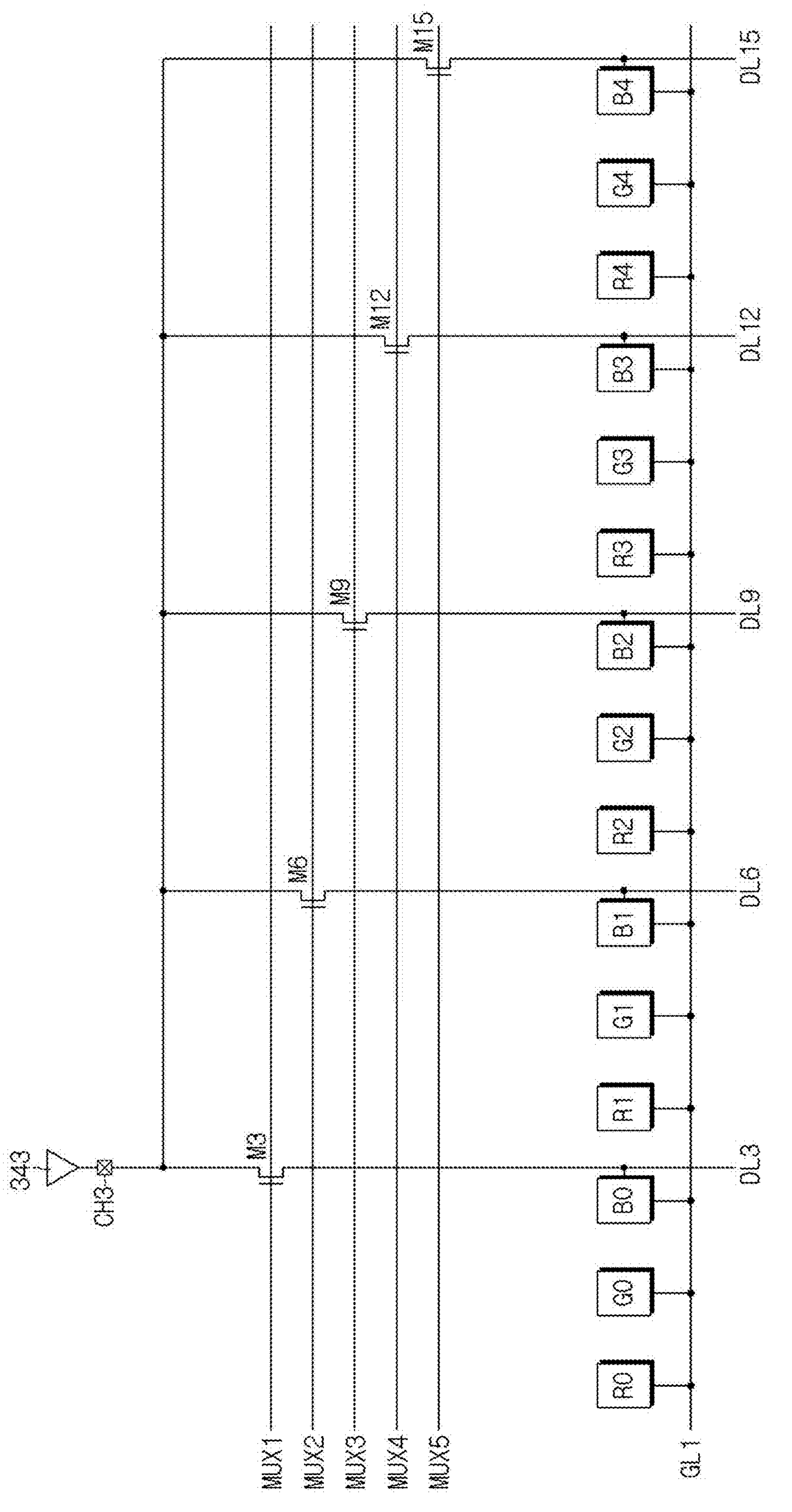

FIGS. 6A to 6C are views for describing a method of controlling the consumed power of the output buffer according to one embodiment of the present disclosure.

Referring to FIG. 4 and FIGS. 6A to 6C together, a plurality of output buffers 3411, 3412, and 3413 each outputting the data voltages to the sub-pixels R0 to R4, G0 to G4, and B0 to B4 of the corresponding colors can be provided. Each of the output buffers 341, 342, and 343 is configured to sequentially output the data voltages to the sub-pixels R0 to R4, G0 to G4, and B0 to B4 of the corresponding colors in response to the mux control signals MUX1 to MUX5 applied sequentially.

For example, the first output buffer 341 can sequentially output the data voltages to the red sub-pixels R0 to R4 as shown in FIG. 6A, at the same time, the second output buffer 342 can sequentially output the data voltages to the green sub-pixels G0 to G4 as shown in FIG. 6B, and at the same time, the third output buffer 343 can sequentially output the data voltages to the blue sub-pixels B0 to B4 as shown in FIG. 6C. To this end, the image data DATA to be output from the output buffers 341, 342, and 343 during the turn-on period of each of the mux control signals MUX1 to MUX5 are sequentially output from the latch unit 32 to the output buffers 341, 342, and 343.

In the present embodiment, the data driver 30 can independently control the consumed power of the output buffers 341, 342, and 343 based on the grayscale difference value of the image data DATA sequentially provided to each of the output buffers 341, 342, and 343. Here, the grayscale difference value can indicate the grayscale difference value of the data voltages to be sequentially output from each of the output buffers 341, 342, and 343 in response to the mux control signals MUX1 to MUX5.

First, the calculation unit 35 can determine the grayscale difference value of the image data DATA provided sequentially to each of the output buffers 341, 342, and 343. Specifically, the calculation unit 35 can determine the grayscale difference value of the image data DATA by comparing the grayscale of the image data DATA output from the latch unit 32 with the grayscale of the previously output image data DATA with respect to each of the output buffers 341, 342, and 343.

The calculation unit 35 can transmit the power control signal PWRC corresponding to the determined grayscale difference value to the power control circuit 36. The power control circuit 36 can determine the magnitude of the bias current Ibias to be provided to the output buffers 341, 342, and 343 in response to the grayscale difference value indicated by the power control signal PWRC. In this case, threshold ranges of the grayscale difference value and a consumed power mode corresponding to each threshold range can be the same as those defined in Table 1.

Next, the power control circuit 36 can provide the bias current Ibias having the determined magnitude to the output buffers 341, 342, and 343. The output buffers 341, 342, and 343 can output the data voltage of the image data DATA having the corresponding grayscale difference value based on the bias current Ibias whose the magnitude is controlled through the power control circuit 36.

The output buffers 341, 342, and 343 can output the amplified data voltage to the data line DL during the turn-on period of the sequentially provided mux control signals MUX1 to MUX5. Therefore, the consumed power of the output buffers 341, 342, and 343 is changed based on the grayscale difference value for each turn-on period of each of the mux control signals MUX1 to MUX5.

As described above, the data driver 30 can independently control and change the consumed power of the output buffers 341, 342, and 343 for each turn-on period of each of the mux control signals MUX1 to MUX5 based on the grayscale difference value, thereby more efficiently reducing the consumed power.

Figure 7:
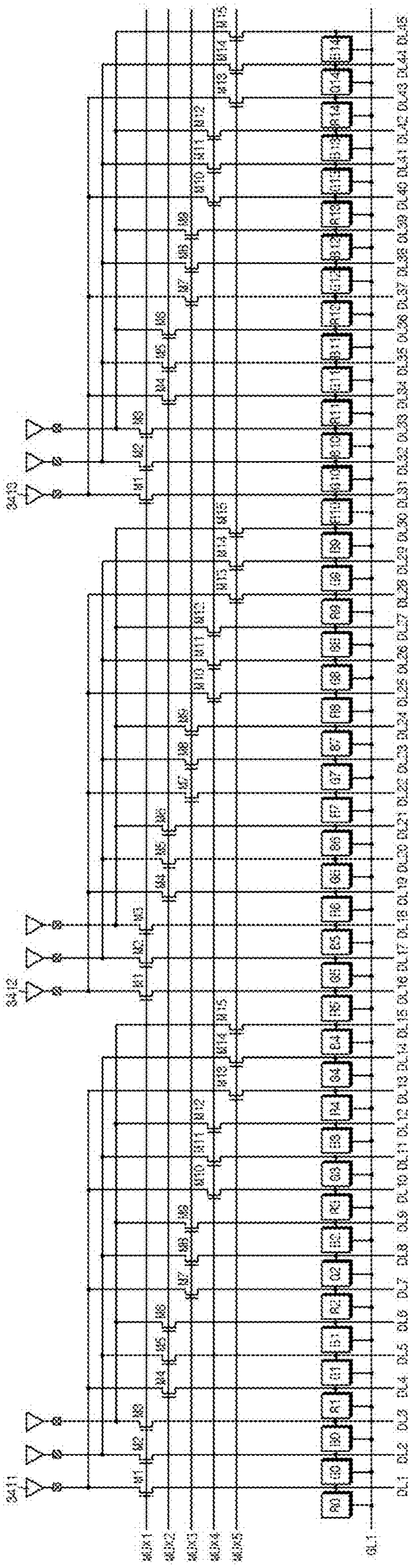
FIG. 7 is a view for describing a method of controlling consumed power of an output buffer according to another embodiment of the present disclosure.

FIG. 7 is a view for describing a method of controlling consumed power of an output buffer according to another embodiment of the present disclosure.

Referring to FIGS. 4 and 7 together, the plurality of output buffers 3411, 3412, and 3413 for outputting the data voltages to the sub-pixels R0 to R14 having the same color can be provided. Each of the output buffers 3411, 3412, and 3413 can sequentially output the data voltages to the sub-pixels R0 to R4, R5 to R9, and R10 to R14 connected to thereto in response to the mux control signals MUX1 to MUX5 applied sequentially.

For example, the first output buffer 3411 can sequentially output the data voltages to the first to fifth red sub-pixels R0 to R4, at the same time, the second output buffer 3412 can sequentially output the data voltages to the sixth to tenth red sub-pixels R5 to R9, and at the same time, the third output buffer 3413 can sequentially output the data voltages to the eleventh to fifteenth red sub-pixels R10 to R14.

To this end, the image data DATA to be output during the turn-on period of each of the mux control signals MUX1 to MUX5 can be sequentially output from the latch unit 32 to the output buffers 341, 342, and 343.

In the present embodiment, the data driver 30 can control the consumed power of the output buffers 3411, 3412, and 3413 based on the grayscale difference value of the image data DATA sequentially provided to each of the output buffers 3411, 3412, and 3413. In other words, the data driver 30 can control the consumed power of the output buffers 3411, 3412, and 3413 based on the grayscale difference value of the data voltages to be sequentially output from each of the output buffers 3411, 3412, and 3413 in response to the mux signals MUX1 to MUX5.

First, the calculation unit 35 can determine the grayscale difference value of the image data DATA provided sequentially to each of the output buffers 3411, 3412, and 3413. Specifically, the calculation unit 35 can determine the grayscale difference value of the image data DATA by comparing the grayscale of the image data DATA output from the latch unit 32 with the previously output image data DATA with respect to each of the output buffers 3411, 3412, and 3413.

In one embodiment, the grayscales of the image data DATA to be output from the output buffers 3411, 3412, and 3413 during the turn-on period of each of the mux control signals MUX1 to MUX5 can be assumed as shown in Table 2 below.

TABLE 2

| | MUX1 | MUX2 | MUX3 | MUX4 | MUX5 |
|---|---|---|---|---|---|
| Outer buffer (3411) | 122 | 190 | 243 | 154 | 49 |
| Outer buffer (3412) | 152 | 34 | 84 | 39 | 182 |
| Outer buffer (3413) | 81 | 177 | 248 | 178 | 41 |

In the present embodiment, the grayscale difference value Δ (e.g., an absolute value of the grayscale difference between the image data consecutively output from the latch unit in response to one output buffer) of the image data DATA from the output buffers 3411, 3412, and 3413 during the turn-on period of each of the mux control signals MUX1 to MUX5 is as shown in Table 3 below.

TABLE 3

| | Δ(MUX1) | Δ(MUX2) | Δ(MUX3) | Δ(MUX4) | Δ(MUX5) |
|---|---|---|---|---|---|
| Outer buffer (3411) | 122<br>(122 − 0) | 68<br>(190 − 122) | 53<br>(243 − 190) | 89<br>(243 − 154) | 105<br>(154 − 49) |
| Outer buffer (3412) | 152 | 118 | 50 | 45 | 143 |
| Outer buffer (3413) | 81 | 96 | 71 | 70 | 137 |

In addition, the calculation unit 35 can change the consumed power by comparing the grayscale difference values determined with respect to the output buffers 3411, 3412, and 3413.

In one embodiment, the calculation unit 35 can determine a maximum value of the grayscale difference values of the output buffers 3411, 3412, and 3413. In the example of Table 3, a maximum value Δmax of the grayscale difference values for the output buffers 3411, 3412, and 3413 is shown in Table 4 below.

TABLE 4

| | Δ(MUX1) | Δ(MUX2) | Δ(MUX3) | Δ(MUX4) | Δ(MUX5) |
|---|---|---|---|---|---|
| Δmax | 152 | 118 | 71 | 89 | 143 |

The calculation unit 35 can transmit the power control signal PWRC corresponding to the maximum value Δmax of the grayscale difference values to the power control circuit 36. The power control circuit 36 can determine the magnitude of the bias current Ibias to be provided to the output buffers 3411, 3412, and 3413 in response to the grayscale difference value indicated by the power control signal PWRC.

When the threshold ranges of the grayscale difference values and the magnitude of the consumed bias current corresponding to each threshold range are as shown in Table 1, the magnitude of the bias current Ibias during the turn-on period of each of the mux control signals MUX1 to MUX5 according to the maximum values Δmax of the grayscale difference values of Table 4 is as shown in Table 5 below.

TABLE 5

| | Δ(MUX1) | Δ(MUX2) | Δ(MUX3) | Δ(MUX4) | Δ(MUX5) |
|---|---|---|---|---|---|
| Δmax | 152 | 118 | 71 | 89 | 143 |
| Ibias | Fourth level | Third level | Second level | Third level | Third level |

In another embodiment, the calculation unit 35 can determine a mean value of the grayscale difference values of the output buffers 3411, 3412, and 3413. In the embodiment of Table 3, mean values Δmean of the grayscale difference values for the output buffers 3411, 3412, and 3413 are shown in Table 6 below.

TABLE 6

| | Δ(MUX1) | Δ(MUX2) | Δ(MUX3) | Δ(MUX4) | Δ(MUX5) |
|---|---|---|---|---|---|
| Δmean | 118 | 94 | 58 | 68 | 128 |

The calculation unit 35 can transmit the power control signal PWRC corresponding to the mean value Δmean of the grayscale difference values to the power control circuit 36. The power control circuit 36 can determine the magnitude of the bias current Ibias to be provided to the output buffers 3411, 3412, and 3413 in response to the grayscale difference value indicated by the power control signal PWRC.

When the threshold ranges of the grayscale difference values and the magnitude of the consumed bias current corresponding to each threshold range are as shown in Table 1, the magnitude of the bias current Ibias during the turn-on period of each of the mux control signals MUX1 to MUX5 according to the mean values Δmean of the grayscale difference values of Table 6 is as shown in Table 7 below.

TABLE 7

| | Δ(MUX1) | Δ(MUX2) | Δ(MUX3) | Δ(MUX4) | Δ(MUX5) |
|---|---|---|---|---|---|
| Δmean | 118 | 94 | 58 | 68 | 128 |
| Ibias | Third level | Second level | Second level | Second level | Third level |

Next, the power control circuit 36 can provide the bias current Ibias having the determined magnitude to the output buffers 3411, 3412, and 3413. The output buffers 341, 342, and 343 can amplify the data voltage of the image data DATA having the corresponding grayscale difference value based on the bias current Ibias whose the magnitude is controlled through the power control circuit 36.

The output buffers 3411, 3412, and 3413 can output the amplified data voltage to the data line DL during the turn-on period of the sequentially provided mux control signals MUX1 to MUX5. Therefore, the consumed power of the output buffers 3411, 3412, and 3413 is changed based on the grayscale difference value for each turn-on period of each of the mux control signals MUX1 to MUX5.

Figure 8:
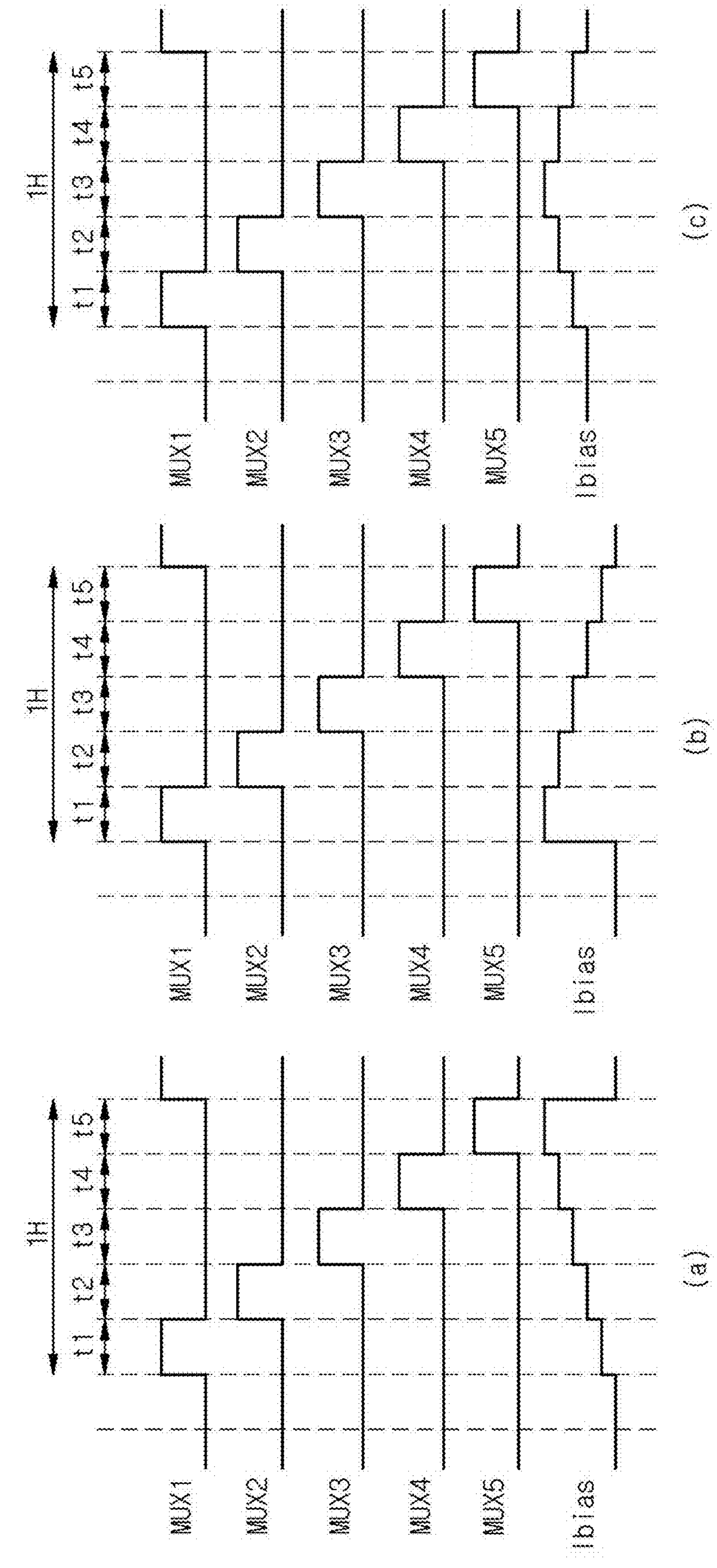
FIGS. 8 and 9 are waveform diagrams showing a method of controlling a bias current according to examples of the present disclosure.
Figure 9:
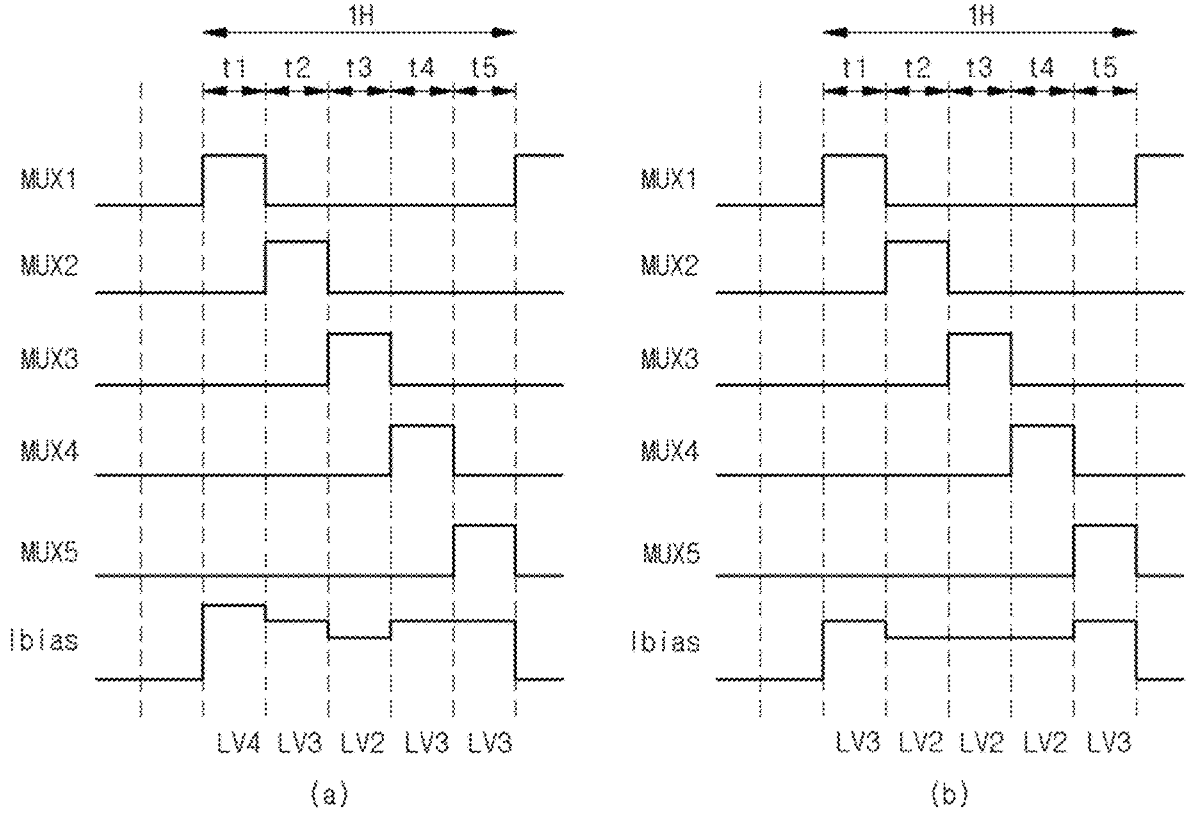

FIGS. 8 and 9 are waveform diagrams showing a method of controlling a bias current according to examples of the present disclosure.

As described with reference to FIGS. 4 to 7, the data driver 30 according to one embodiment of the present disclosure adaptively controls the consumed power of the output buffer 34 based on the grayscale difference value of the image data DATA to be output from the output buffer 34. For example, the data driver 30 changes the consumed power of the output buffer 34 according to the grayscale difference value of the image data DATA (or the data voltages) to be sequentially output from one output buffer 34 during the turn-on period of each of the mux control signals MUX1 to MUX5. Alternatively, for example, the data driver 30 can compare the grayscale difference values of a plurality of adjacent output buffers 34 connected to the sub-pixels having the same color and change the consumed power of the plurality of output buffers 34 according to the maximum value or the mean value of the grayscale difference value.

Therefore, as shown in FIG. 8, the magnitude of the bias current Ibias provided to the output buffer 34 is changed in response to the turn-on period of each of the mux control signals MUX1 to MUX5. For example, the magnitude of the bias current Ibias can gradually increase as shown in (a) of FIG. 8 or gradually decrease as shown in (b) of FIG. 8 every turn-on period of the mux control signals MUX1 to MUX5 during the one horizontal period (1H). Alternatively, the magnitude of the bias current Ibias can gradually increase (or decrease) and then gradually decrease (or increase) as shown in (c) of FIG. 8 every turn-on period of the mux control signals MUX1 to MUX5 during the one horizontal period (1H).

In FIG. 9, a method of controlling the bias current according to the embodiment shown in FIG. 7 is shown. In one embodiment, when the data driver 30 controls the bias current Ibias based on the maximum value of the grayscale difference value between the output buffers 3411, 3412, and 3413, the bias current Ibias can be controlled as shown in (a) of FIG. 9 according to Table 7. In another embodiment, when the data driver 30 controls the bias current Ibias based on the mean value of the grayscale difference value between the output buffers 3411, 3412, and 3413, the bias current Ibias can be controlled as shown in (b) of FIG. 9 according to Table 9.

In the data driver and the display device including the same according to the embodiments of the present disclosure, it is possible to reduce the consumed power of the display device by changing the consumed power of the data driver during one horizontal period.

In addition, in the data driver and the display device including the same according to the embodiments of the present disclosure, it is possible to enable the efficient low-power driving by changing the consumed power of the output buffers in the data driver according to the grayscale difference value to enable the efficient low-power driving.

Those skilled in the art to which the present disclosure pertains will be able to understand that the present disclosure can be carried out in other specific forms without changing the technical spirit or essential features thereof. Therefore, it should be understood that the above-described embodiments of the present disclosure are illustrative and not restrictive in all respects. The scope of the present disclosure is defined by the appended claims to be described below rather than the detailed description, and all changes or modifications derived from the meaning and scope of the claims and equivalent concepts thereof should be construed as being included in the scope of the present disclosure.

What is claimed is:

1. A display device comprising:

a display panel including a plurality of sub-pixels;

a data driver configured to convert image data input from an outside and provide data voltages to the plurality of sub-pixels through a plurality of data lines; and a multiplexer connected between the data driver and the plurality of data lines, and including a plurality of switching elements controlled by a plurality of mux control signals, wherein the data driver includes a plurality of output buffers, and controls a bias current supplied to each of the plurality of output buffers based on a grayscale difference value of the image data provided to the plurality of sub-pixels, wherein each of the plurality of output buffers is configured to amplify and output the data voltage based on the bias current, and wherein the data driver includes: a register unit configured to generate a sampling signal using a data driving control signal applied from the outside;

a latch unit configured to sequentially latch the image data and sequentially output the image data in response to the sampling signal;

a digital-to-analog converter configured to convert the image data output from the latch unit into gamma compensation voltages and generate the data voltages;

a calculation unit configured to determine the grayscale difference value by comparing a grayscale of the image data output from the latch unit with a grayscale of previously output image data of the image data sequentially output from the latch unit;

a power control circuit configured to generate the bias current having a magnitude corresponding to the grayscale difference value and apply the bias current to the plurality of output buffers, and wherein the calculation unit compares the grayscale difference values with respect to the plurality of output buffers configured to output the data voltages to the sub-pixels having a same color, and the power control circuit adjusts the magnitude of the bias current for the plurality of output buffers according to a result of the comparison.

2. The display device of claim 1, wherein the power control circuit decreases the magnitude of the bias current when the grayscale difference value is small and increases the magnitude of the bias current when the grayscale difference value is large.

3. The display device of claim 2, wherein consumed power for the data driver is changed in proportion to the magnitude of the bias current.

4. The display device of claim 1, wherein the calculation unit determines the grayscale difference value of the image data sequentially output with respect to each of the plurality of output buffers, and the power control circuit independently adjusts the magnitude of the bias current for each of the plurality of output buffers in response to the grayscale difference value.

5. The display device of claim 1, wherein the calculation unit determines a maximum value or mean value of the grayscale difference values with respect to the plurality of output buffers configured to output the data voltages to the sub-pixels having the same color, and the power control circuit adjusts the magnitude of the bias current for the plurality of output buffers configured to output the data voltage to the sub-pixels having the same color in response to the maximum value or mean value of the grayscale difference values.

6. The display device of claim 1, wherein one of the plurality of output buffers is connected to some sub-pixels having the same color through the plurality of switching elements of the multiplexer.

7. The display device of claim 6, wherein one switching element among the plurality of switching elements is connected between the one of the plurality of output buffers and one sub-pixel.

8. The display device of claim 7, wherein the plurality of switching elements connected to the one of the plurality of output buffers are controlled by mux control signals having different turn-on periods.

9. The display device of claim 8, wherein, when one mux control signal is turned on, the data voltage is output to sub-pixels having different colors constituting one unit pixel from the plurality of output buffers.

10. A display device comprising:

a display panel including a plurality of sub-pixels;

a data driver configured to convert image data input from an outside and provide data voltages to the plurality of sub-pixels through a plurality of data lines; and a multiplexer connected between the data driver and the plurality of data lines and including a plurality of switching elements controlled by a plurality of mux control signals, wherein one output buffer is connected to some sub-pixels having a same color among the plurality of sub-pixels, through the plurality of switching elements of the multiplexer, wherein the plurality of switching elements connected to the one output buffer are controlled by mux control signals having different turn-on periods to sequentially output the data voltages from the one output buffer to the some sub-pixels having a same color, wherein a calculation unit determines a grayscale difference value of the image data sequentially output with respect to the one output buffer connected to some sub-pixels having a same color, and a power control circuit independently adjusts a magnitude of a bias current for each of the one output buffer in response to the grayscale difference value.

11. The display device of claim 10, wherein one switching element among the plurality of switching elements is connected between the one output buffer and one sub-pixel.

12. The display device of claim 11, wherein, when one mux control signal is turned on, the data voltage is output to sub-pixels having different colors constituting one unit pixel from a plurality of output buffers.

13. The display device of claim 12, wherein the data driver has consumed power that is changed based on the grayscale difference value of the image data provided to the plurality of sub-pixels.

14. The display device of claim 13, wherein the data driver further includes:

a register unit configured to generate a sampling signal using a data driving control signal applied from the outside;

a latch unit configured to sequentially latch the image data and sequentially output the image data in response to the sampling signal;

a digital-to-analog converter configured to convert the image data output from the latch unit into gamma compensation voltages and generate the data voltages;

a plurality of output buffers configured to amplify and output the data voltage based on the bias current;

the calculation unit configured to determine the grayscale difference value of the image data sequentially output from the latch unit; and the power control circuit configured to generate the bias current having the magnitude corresponding to the grayscale difference value and apply the bias current to the plurality of output buffers.

15. The display device of claim 14, wherein the power control circuit decreases the magnitude of the bias current when the grayscale difference value is small and increases the magnitude of the bias current when the grayscale difference value is large.

16. The display device of claim 14, wherein the calculation unit determines a maximum value or mean value of the grayscale difference values with respect to the plurality of output buffers configured to output the data voltages to the sub-pixels having the same color, and the power control circuit adjusts the magnitude of the bias current for the plurality of output buffers configured to output the data voltage to the sub-pixels having the same color in response to the maximum value or mean value of the grayscale difference values.

* * * * *